United States Patent
Sagiv

(10) Patent No.: US 6,194,513 B1
(45) Date of Patent: Feb. 27, 2001

(54) TINTABLE WATER-BASED COATING COMPOSITION

(75) Inventor: Efraim Sagiv, New Haven, CT (US)

(73) Assignee: Olin Corporation, New Haven, CT (US)

(*) Notice: Subject to any disclaimer, the term of this patent is extended or adjusted under 35 U.S.C. 154(b) by 0 days.

(21) Appl. No.: 09/400,771

(22) Filed: Sep. 22, 1999

(51) Int. Cl.$^7$ ..................................................... C08L 75/04
(52) U.S. Cl. .......................... 524/832; 524/507; 524/494; 524/601; 524/779; 106/287.13; 525/127; 525/101; 428/425.8
(58) Field of Search ..................................... 525/100, 101, 525/127; 524/832, 507; 106/287.13

(56) References Cited

U.S. PATENT DOCUMENTS

| | | | |
|---|---|---|---|
| 5,118,752 | 6/1992 | Chang et al. | 524/521 |
| 5,141,983 | 8/1992 | Hasegawa et al. | 524/457 |
| 5,204,404 | 4/1993 | Werner et al. | 524/501 |
| 5,286,569 | 2/1994 | Werner et al. | 428/423.1 |
| 5,739,194 | 4/1998 | Natesh | 524/457 |

*Primary Examiner*—James J. Seidleck
*Assistant Examiner*—Melanie D. Bagwell
(74) *Attorney, Agent, or Firm*—Todd E. Garabedian; Wiggin & Dana

(57) ABSTRACT

The present invention is directed to a tintable coating composition, comprising an admixture of (A) about 2 to about 80 wt % of a carboxylated urethane polymer mixture made from 2,6-hexanediol and 4,4-methylenebis (cyclohexylisocyanate); (B) about 5 to about 65 wt % of a hydroxylated methylmethacrylate acrylic polymer; (C) about 0.2 to about 10 wt % of an epoxylated silane crosslinking agent; and (D) optionally, about 0.5 wt % to about 25 wt % of a solvent; all percentages based on the total weight of the coating composition. The coating composition of the present invention may be used as a clear coating, or may include a decorative component such as dyes, pigments, colorants, metal flakes, metal powders, glass flakes, glass powders, and combinations thereof, that add a decorative or colored characteristic to the disclosed coating composition.

15 Claims, No Drawings

TINTABLE WATER-BASED COATING COMPOSITION

BACKGROUND OF THE INVENTION

1. Field of the Invention

The present invention relates to tintable coating compositions, and more particularly to a tintable coating compositions made from an admixture of a carboxylated urethane polymer mixture made from 2,6-hexanediol and 4,4-methylenebis(cyclohexylisocyanate); a hydroxylated methylmethacrylate acrylic polymer; an epoxylated silane cross-linking agent; and an optional solvent.

2. Description of the Related Art

Increasingly stringent environmental regulations are gradually phasing out organic solvent-based paints, coatings, and adhesives in favor of those using more innocuous solvents, such as water. Water-based polymer coating components are becoming increasingly available to impart unique characteristics to metal surfaces, such as color, gloss, adhesive layers, corrosion protection, mar and wear resistance, and the like. However, such water-based polymer coatings have not performed as well as their organic solvent-based counterparts in terms of hardness, gloss, durability, and other characteristics that are demanded from the marketplace. Consequently, there is continuing development in the area of water-based polymer coatings that perform as well as organic solvent-based polymer coatings, yet are not damaging to the environment.

U.S. Pat. No. 5,118,752 discloses aqueous polymerization of vinyl monomers, including acrylates, in the presence of a polymeric surfactant containing urethane groups and silane groups.

U.S. Pat. No. 5,141,983 discloses an aqueous coating composition comprising an aqueous polyurethane resin and an aqueous dispersion of an acrylic copolymer, and an aqueous coating composition obtained by polymerizing radical-polymerizable acrylic monomers in the presence of an aqueous urethane resin.

U.S. Pat. No. 5,204,404 discloses a water-based coating composition containing an acrylic silane polymer and a polyurethane polymer. Similarly, U.S. Pat. No. 5,286,569 also discloses a water-based coating composition containing an acrylic silane polymer and a polyurethane polymer.

U.S. Pat. No. 5,739,194 discloses an aqueous dispersion of urethane and vinyl polymers that make up a water-based coating composition.

While these coating materials may be satisfactory for certain applications, there is still need for improved tintable coating compositions that have properties such as color or decoration, gloss, mar-, wear-, and moisture-resistance, long adhesion to the substrate, the like, yet are water-based and safe for the environment. The present invention is believed to be an answer to that need.

SUMMARY OF THE INVENTION

In one aspect, the present invention is directed to a tintable coating composition, comprising an admixture of (A) about 2 to about 80 wt % of a carboxylated urethane polymer dispersion mixture made from 2,6-hexanediol and 4,4-methylenebis(cyclohexylisocyanate); (B) about 5 to about 65 wt % of a hydroxylated methylmethacrylate acrylic polymer emulsion; (C) about 0.2 to about 10 wt % of an epoxylated silane cross-linking agent; and (D) optionally, about 0.5 wt % to about 25 wt % of a solvent; all percentages based on the total weight of the coating composition. The coating composition of the present invention may be used as a clear coating, or may include a decorative component such as dyes, pigments, colorants, metal flakes, metal powders, glass flakes, glass powders, and combinations thereof, that add a decorative or colored characteristic to the coating composition of the invention.

In another aspect, the present invention is directed to a tintable coating composition, comprising an admixture of (A) about 2 to about 80 wt % of a carboxylated urethane polymer dispersion mixture made from 2,6-hexanediol and 4,4-methylenebis(cyclohexylisocyanate), wherein the carboxylated urethane polymer mixture comprises a mixture of from about 2 to about 75 wt % of a first carboxylated urethane polymer made from 2,6-hexanediol and 4,4-methylenebis(cyclohexylisocyanate), and having an acid number of about 36, and about 5 to about 80 wt % of a second carboxylated urethane polymer made from 2,6-hexanediol and 4,4-methylenebis (cyclohexylisocyanate), and having an acid number of about 28; (B) about 5 to about 65 wt % of a hydroxylated methylmethacrylate acrylic polymer emulsion; (C) about 0.2 to about 10 wt % of an epoxylated silane cross-linking agent comprising glycidoxypropyltrimethoxysilane; (D) about 5 to about 30 wt % a decorative component selected from the group consisting of dyes, metal flakes, metal powders, glass flakes, glass powders, and combinations thereof; (E) about 0.005 to about 2 wt % of one or more additives selected from the group consisting of surfactants, defoamers, and combinations thereof; and (F) optionally, about 0.5 wt % to about 25 wt % of a solvent selected from the group consisting of water, N-methylpyrrolidone, butylcarbitol, 2-butoxyethanol, isopropyl alcohol, and combinations thereof; all percentages based on the total weight of the coating composition.

In yet another aspect, the present invention is directed to substrates coated with the above coating compositions.

These and other aspects will be more fully understood from the following detailed description of the invention.

DETAILED DESCRIPTION OF THE INVENTION

It has now been found, in accordance with the present invention, that an admixture of (1) about 2 to about 80 wt % of a carboxylated urethane polymer dispersion mixture made from 2,6-hexanediol and 4,4-methylenebis (cyclohexylisocyanate); (B) about 5 to about 65 wt % of a hydroxylated methylmethacrylate acrylic polymer emulsion; and (C) about 0.2 to about 10 wt % of an epoxylated silane cross-linking agent forms a water-based coating composition that possesses excellent hardness, durability, and wear-resistance. The coating composition of the invention has a low VOC (volatile organic content) and can be pigmented with many existing commercial pigments or other decorative additives to form "tinted" coatings. The composition has excellent adhesion to a variety of substrates such as aluminum, copper, stainless steel, cold rolled steel, phosphatized steel, steel coated with conventional primers such as electrodeposition primers and the like, plastic substrates such as polyester reinforced fiber glass, injection molded urethanes, polystyrenes, and polyimides. A clear coat can be applied to a layer of the tinted composition to provide a clear/color coat finish. The coating composition used for the clear coat can be the coating composition of this invention or another compatible aqueous or solvent based coating composition.

As used herein, the term "tintable" refers broadly to the presence of a decorative component in the composition of the present invention, such as a colorant, dye, pigment, metal flake or powder, or glass flake or powder, or other decorative component, to provide the coating composition with color or other decorative effect. The term "dispersion", as used herein, refers generally to a two-phase system where one phase consists of finely divided particles distributed throughout a bulk substance (usually a solvent). The term "emulsion" refers to a stable mixture of two or more immiscible liquids held in suspension by small amounts of emulsifiers.

As mentioned above, the invention is a tintable coating composition, comprising an admixture containing primarily (A) a carboxylated urethane polymer dispersion mixture made from 2,6-hexanediol and 4,4-methylenebis (cyclohexylisocyanate); (B) a hydroxylated methyl-methacrylate acrylic polymer emulsion; (C) an epoxylated silane cross-linking agent; and (D) optionally, a solvent. Each of these components is discussed in more detail below.

The carboxylated urethane polymer dispersion component of the present composition is a dispersion made from a combination of 2,6-hexanediol and 4,4-methylenebis (cyclohexylisocyanate). The solvent portion of the dispersion may be water, or a combination of water and water-miscible or water-immiscible organic solvents. A preferred material is sold under the trade name QUINN QW 18-1 (available commercially from K. J. Quinn & Co, Inc., Seabrook, N.H. and has an acid number of about 36. When cured, this particular product, by itself, has a sword hardness of about 25. Another preferred material having a similar combination of ingredients is sold under the tradename QUINN QW 26 (also available commercially from K. J. Quinn), and has an acid number of about 28. When cured, this particular product, by itself, has a sword hardness of about 40.

In the composition of the present invention, the preferred products QW 18-1 and QW 26 may be used individually or in combination. Generally, the total amount of carboxylated urethane polymer is preferably in the range from about 2 wt % to about 80 wt %, based on the total weight of the composition. In one embodiment, a combination of QW 18-1 and QW 26 is used in which QW 18-1 is present in the composition in the range of from about 2 to about 75 wt %, based on the total weight of the composition, and QW 26 is present in the composition in the range of from about 5 to about 80 wt %, based on the total weight of the composition. A more preferred combination is made from between about 15 wt % and about 25 wt % of QW 18-1, and about 20 wt % to about 30 wt % of QW 26, all based on the total weight of the composition. A particularly preferred amount of carboxylated urethane polymer is about 26 wt % Quinn QW 26, and about 18.8 wt % Quinn QW 18-1. Additional specifically preferred combinations are summarized in the Examples below.

The hydroxylated methylmethacrylate acrylic polymer component of the present invention is preferably a product sold as an aqueous emulsion under the tradename "MAIN-COTE AE58" by Rohm & Haas Corporation, and has a glass transition temperature ($T_g$) of +50° C. Preferably, this component of the composition of the invention is present in the range between about 5 wt % and 65 wt %, and more preferably between about 30 wt % and 40 wt %, based on the total weight of the composition. A particularly preferred amount of hydroxylated methylmethacrylate acrylic polymer emulsion is 34 wt %.

The epoxylated silane cross-linking agent component of the invention is preferably glycidoxypropyltrimethoxy silane, and related compounds. Suitable combinations of these epoxylated silane cross-linking agents may also be used. The epoxylated silane cross-linking agent component of the invention preferably ranges from about 0.2 wt % to about 10 wt %, based on the total weight of the composition. If glycidoxypropyltrimethoxy silane is used as the cross-linking agent, useful amounts range preferably between about 0.5 to about 10 wt %, and more preferably between about 1.5 and about 4 wt %, based on the total weight of the composition. Glycidoxypropyltrimethoxy silane is available commercially from Dow Corning and is sold under product number Z6040. A particularly preferred amount of epoxylated silane cross-linking agent is 1.75 wt % of Dow Corning Z6040. The appropriate amount of epoxylated silane cross-linking agent may be diluted (e.g., 50%) in a suitable solvent. For example, one may add 3.5 wt % of a 50:50 (w:w) mixture of epoxylated silane cross-linking agent and N-methylpyrrolidone as shown in Example 4 below.

It should be understood that the amount of cross-linking agent used in any particular application will depend on the age of the cross-linking agent, and the desired degree of cross-linking required for the composition. With respect to the age of the cross-linking material, it is know that epoxylated silane cross-linking agents decompose over time. Therefore, one skilled in the art can easily adjust the amount of cross-linking agent in any particular composition of the invention to account for this phenomenon. Also, one of skill in the art can adjust the amount of cross-linking agent to obtain a desired degree of cross-linking. Without wishing to be bound by any particular theory, it is believed that the epoxylated silane component produces cross linking in the coating which is responsible for the excellent durability, mar- and wear-resistance, as well as its outstanding chemical and moisture resistance properties.

Optionally, additional solvent may be added to the coating composition of the invention to achieve a specific viscosity for applications such as spraying, or to achieve a certain dry/cure to time. Suitable solvents include water, combinations of water and water-miscible or water-immiscible organic solvents, or water-miscible or water-immiscible organic solvents. Useful solvents include water, N-methylpyrrolidone, butylcarbitol, 2-butoxyethanol, various alcohols, such as isopropyl alcohol, and the like. Suitable combinations of these solvents may also be employed in the composition of the present invention. Useful amounts of these solvents range from 0.5 to 25 wt %, based on the total amount of the coating composition.

The coating composition of the present invention may be used as a clear coat, or may include a decorative component, such as a colorant dye, pigment, metal flake or powder, or glass flake or powder, to provide the coating composition with color or other decorative effect. Particularly useful decorative additions to the composition of the present invention are inks that impart a color to the coating composition. A variety of suitable inks are available commercially from Tech Ink Inc. (Akron, Ohio). In one embodiment, the coating composition of the invention includes a red ink such as red ink number A-3701 from Tech Ink, Inc. Generally, the decorative component of the invention is present in amounts ranging from about 5 to about 40 wt %, and more preferably from about 15 to 20 wt %, based on the total weight of the composition, depending on coating thickness and color/decorative tone desired.

The water-based coating composition of the invention may include other ingredients that enhance the adhesion of the composition to the substrate, or that aid in it's application to the substrate. Such additional additives include, but are not limited to, film-forming solvents, defoamers, surfactants, and combinations thereof. Preferably, these additional additives comprise, it total, between about 0.005 to about 2 wt % of the composition.

2-Butoxyethanol may be added to the coating composition of the invention as a film-forming agent. The film-forming agent is added to the composition to provide a smooth coating surface for maximum coating area. Alternative film-forming agents include N-methylpyrrolidone, diethylene glycol, or other organic solvents known in the art that have boiling points higher than that of water. Preferably, the film-forming agent is present in the composition from about 0 to about 1% by weight of the total composition, and more preferably, from about 0.0005 to about 0.015% by weight of the total composition.

A defoaming agent may be included in the coating composition of the invention to prevent air entrapment during processing and to provide a smooth coating surface that provides maximum surface area for adhesion. Exemplary defoaming agents include siloxane-based defoaming agents such as Dow Corning #62, silicon oils, mineral oils, modified alcohol ethoxylates, EO/PO block copolymers (repeating units of ethoxy and propoxy groups), phosphate esters, hydrophobic silica, and fatty alcohols as well as blends of these. Other defoaming agents include copolymers of EO/PO sold under the trademark "BASF PLURONICS", alkoxylated straight chain alcohols sold under the trademark "PLURFACS"; alkoxylated fatty acids, alcohols, or glycols sold under the trademark "ANTAROX"' alkoxylated alcohols and coblock polymers of EO/PO sold under the trademark "MACOL"; alkylphenol alkoxylates sold under the trademark "TRITON CF"' alkoxylated alcohols sold under the trademark "TRITON DF"; alkylated secondary alcohols sold under the trademark "TERGITOL", "MINIFOAM", "15S" and "TMN"; and alkoxylated linear alcohols and glycols sold under the trademark "SURFONIC". The defoaming agent preferably comprises about 0 to about 1% by weight of the total composition, and more preferably 0.00125 to about 0.0125% by weight of the total composition. A particularly useful defoaming agent is a polyether modified dimethylsiloxane, such as Dow Corning additive #62 (available from Dow Corning), and a particularly useful amount is about 0.005 wt %, based on the total amount of the coating composition.

A surfactant may be added to the coating composition of the invention to aid in leveling the composition on the substrate as it is applied. One preferred type of surfactant useful in the coating composition of the invention are the silicon-based surfactants, such as "SILWET" (Witco Chemical Co.). Another exemplary surfactant useful in the composition of the invention includes poly(oxyethylene/oxypropylene) alkyl ethers sold under the trademark "POLYTERGENT". Alternatively, nonionic surfactants which are coblock polymers of ethylene oxide/propylene oxide monomers may be used in the formulation of the invention. These compounds are known commercially as the "POLYTERGENT" P and E Series and are available from Olin Corporation. Particularly useful surfactants are the hydroxylated dimethylsiloxanes, such as Dow Corning Q2-5211 available from Dow Corning. Preferably, the surfactant component is present in the composition from about 0 to about 1 percent by weight of the total composition, and more preferably from about 0.00125 to about 0.05% by weight of the total composition. A particularly useful amount of surfactant is 0.025 wt %, based on the total weight of the coating composition.

The coating composition of the present invention is prepared by mixing the carboxylated urethane polymer dispersion mixture, the hydroxylated methylmethacrylate acrylic polymer emulsion, the epoxylated silane cross-linking agent, and any additional components such as dyes, colorants, decorative flakes, defoamers, surfactants, solvents, and the like, in a commercial mixer, such as a Ross mixer. The entire mixture is blended until a smooth and homogeneous coating composition is obtained.

The prepared coating composition may be applied to a variety of substrates such as stainless steel, aluminum, copper, iron, cold rolled steel, phosphatized steel, steel coated with conventional primers such as electrodeposition primers and the like, plastic substrates such as polyester reinforced fiber glass, injection molded urethanes, polystyrenes, polyimides, and the like. In some cases, the substrate should be cleaned prior to coating with the composition of the invention to assure good adhesion and durability.

The composition of the invention may be applied to the selected substrate by any method known in the art, such as draw down rod, doctor blading, gravure roll, spraying, dipping, and the like. Preferably, the coating composition of the invention is applied to the substrate at about 0.2 to 0.4 mil wet thickness, and is cured in an oven at a temperature between 200° C. and 250° C. for 30 seconds to about 20 minutes. A preferred cure procedure is heating in a convection oven set to about 250° C. and exposing the coated substrate to that temperature for about 2–3 minutes. The thickness of the dried coating is generally in the range of from about 0.1 to about 0.2 mil.

The water-based coating composition of the invention possesses excellent hardness, durability, wear-, mar-, and moisture-resistance. The coating composition of the invention also has a low VOC (volatile organic content), excellent substrate adhesion, and is suitable for many applications, such as automotive paints, clear coats, and the like, where durability and long adhesion life are required. The composition of the present invention also possesses low VOC content (about 1.8 lbs/gallon (minus water) and about 0.88 lbs/gallon including water) making it an environmentally innocuous product.

The following Examples are provided to better illustrate the present invention. All parts and percentages are by weight and all temperatures are degrees Celsius, unless explicitly stated otherwise.

EXAMPLES

Example 1 (Control)

A. A control sample was first made by coating the surface of 0.0118" thick 301 stainless steel with 0.1 mil thick of commercial red flexographic ink (Tech Ink Inc.) using a draw down bar. The coating was cured onto stainless steel in a convection oven at 240° C. for 0.5 minutes. Following curing, the coated material was cut into small coupons and subjected to a tape adhesion test per ASTM D3359. Specifically, the coating was scribed with a razor blade into 1 mm squares and a section of transparent 3M #600 adhesive tape applied over the scribed area. The tape was pulled off rapidly at about a 90° angle to the substrate to check the adhesion of the coating. The results of this test showed that the control coating had good adhesion to the substrate.

B. Coupons of the coated stainless steel were subjected to (1) a 180 degree (2t radius) bend test, and (2) a 90 degree (4t radius) bend test. Following bending, a section of transparent adhesive tape (3M #600 adhesive tape) was applied over the bent area and rapidly removed to evaluate the adhesion of the coating in the bent area. It was observed that the coating was nearly completely removed from the stainless steel surface at the area of the bend.

C. In another test, coated coupons were exposed to 121° C. at 15 psi (pressure cooker) for 66 hours. Immediately after the exposure, the samples were thoroughly wiped dry, and the coating subjected to adhesion test per ASTM D3359 as described above. The coating exhibited widespread blistering and significant adhesion loss.

D. In a chemical resistance test, a tissue wet with acetone was rubbed against the surface of the coated stainless steel. All the coating was removed due to the solubility of the polymer coating in the acetone.

E. In a stamping test, coated stainless steel coupons were subjected to impact and bending from a commercial stamping machine. In this example, the red flexographic ink flaked off the stainless steel substrate following the impact and bending.

Example 2

A tinted, water-base coating composition was made using the components shown in Table I:

TABLE I

| Component | Wt % |
| --- | --- |
| Hydroxylated acrylic polymer (Rohm & Haas MAINCOTE AE58) | 60.47 |
| Carboxylated urethane polymer (13 wt % Quinn QW 18-1; 18 wt % Quinn QW-26) | 31.00 |
| Epoxylated silane cross linking agent (glycidoxypropyltrimethoxy silane; Dow Corning Z6040) | 3.00 |
| Red acrylic colorant (#A-3701, Tech Ink Inc.) | 5.50 |
| Hydroxylated dimethylsiloxane (surfactant, Dow Corning Q2-5211) | 0.025 |
| Polyether modified dimethylsiloxane (defoamer, Dow Corning additive #62) | 0.005 |

Clean sheets of 0.0118" stainless steel were coated with the above composition (about 0.2 mil thick). The coated stainless steel sheets were dried, cut into coupons, and tested as described in Example 1.

In this Example, the coating adhesion as determined by the scribe test (ASTM D3359) and pressure cooker test was excellent. The coating also was unaffected by the 90 and 180 degree bend tests described in Example 1 with no coating loss. The coating was also resistant to removal when exposed to acetone as described in Example 1, and had a pencil hardness of 2H.

Example 3

A second tinted, water-base coating composition was made using the components shown in Table II:

TABLE II

| Component | Wt % |
| --- | --- |
| Hydroxylated acrylic polymer (Rohm & Haas MAINCOTE AE58)) | 38.97 |
| First Carboxylated urethane polymer (Quinn QW 18-1) | 20.00 |
| Second Carboxylated urethane polymer (Quinn QW 26) | 33.50 |
| Epoxylated silane cross linking agent (glycidoxypropyltrimethoxy silane; Dow Corning Z6040) | 2.00 |

TABLE II-continued

| Component | Wt % |
| --- | --- |
| Red acrylic colorant (#A-3701, Tech Ink Inc.) | 5.50 |
| Hydroxylated dimethylsiloxane (surfactant, Dow Corning Q2-5211) | 0.025 |
| Polyether modified dimethylsiloxane (defoamer, Dow Corning additive #62) | 0.005 |

Clean sheets of 0.0118" stainless steel were coated with the above composition (0.2 mil thick). The coated stainless steel sheets were dried, cut into coupons, and tested as described in Example 1.

In this Example, the coating adhesion as determined by the scribe test (ASTM D3359) and pressure cooker test was excellent. The coating also was unaffected by the 90 and 180 degree bend tests described in Example 1 with no coating loss. The coating was also resistant to removal when exposed to acetone as described in Example 1, and had a pencil hardness of 2H.

Example 4

Another tinted, water-base coating composition was made using the components shown in Table III:

TABLE III

| Component | Wt % |
| --- | --- |
| Hydroxylated acrylic polymer (Rohm & Haas MAINCOTE AE58)) | 34 |
| First Carboxylated urethane polymer (Quinn QW 18-1) | 18.8 |
| Second Carboxylated urethane polymer (Quinn QW 26) | 26.0 |
| Epoxylated silane cross linking agent (glycidoxypropyltrimethoxy silane; Dow Corning Z6040; 50:50 w:w with N-methylpyrrolidone solvent) | 3.5 |
| Red acrylic colorant (#A-3701, Tech Ink Inc.) | 17.1 |
| Combination of Hydroxylated dimethylsiloxane (surfactant, Dow Corning Q2-5211 (33.3 wt %)); isopropyl alcohol (33.3 wt %); and water (33.3 wt %) | 0.6 |

Clean sheets of 0.0118" stainless steel were coated with the above composition (0.2 mil thick). The coated stainless steel sheets were dried, cut into coupons, and tested as described in Example 1.

In this Example, the coating adhesion as determined by the scribe test (ASTM D3359) and pressure cooker test was excellent. The coating also was unaffected by the 90 and 180 degree bend tests described in Example 1 with no coating loss. The coating was also resistant to removal when exposed to acetone as described in Example 1, and had a pencil hardness of 2H.

Example 5

Another tinted, water-base coating composition was made using the components shown in Table IV:

TABLE IV

| Component | Wt % |
| --- | --- |
| Hydroxylated acrylic polymer (Rohm & Haas MAINCOTE AE58) | 34 |
| First Carboxylated urethane polymer (Quinn QW 18-1) | 18.8 |

TABLE IV-continued

| Component | Wt % |
| --- | --- |
| Second Carboxylated urethane polymer (Quinn QW 26) | 26.0 |
| Epoxylated silane cross linking agent (glycidoxypropyltrimethoxy silane; Dow Corning Z6040) | 1.75 |
| Red acrylic colorant (#A-3701, Tech Ink Inc.) | 17.1 |
| Combination of Hydroxylated dimethylsiloxane (surfactant, Dow Corning Q2-5211 (33.3 wt %)); isopropyl alcohol (33.3 wt %); and water (33.3 wt %) | 0.6 |

Clean sheets of 0.0118" stainless steel were coated with the above composition (0.2 mil thick). The coated stainless steel sheets were dried, cut into coupons, and tested as described in Example 1.

In this Example, the coating adhesion as determined by the scribe test (ASTM D3359) and pressure cooker test was excellent. The coating also was unaffected by the 90 and 180 degree bend tests described in Example 1 with no coating loss. The coating was also resistant to removal when exposed to acetone as described in Example 1, and had a pencil hardness of 2H.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A tintable coating composition, comprising an admixture of:
   A. about 2 to about 80 wt % of a carboxylated urethane polymer dispersion mixture made from 2,6-hexanediol and 4,4-methylenebis(cyclohexylisocyanate);
   B. about 5 to about 65 wt % of a hydroxylated methyl-methacrylate acrylic polymer emulsion;
   C. about 0.2 to about 10 wt % of an epoxylated silane cross-linking agent; and
   D. optionally, about 0.5 wt % to about 25 wt % of a solvent; all percentages based on the total weight of the coating composition.

2. The tintable coating composition of claim 1, wherein said carboxylated urethane polymer dispersion mixture comprises a mixture of about 2 to about 75 wt % of a first carboxylated urethane polymer made from 2,6-hexanediol and 4,4-methylenebis(cyclohexylisocyanate), and an acid number of about 36, and about 5 to about 80 wt % of a second carboxylated urethane polymer made from 2,6-hexanediol and 4,4-methylenebis(cyclohexylisocyanate), and having an acid number of about 28.

3. The tintable coating composition of claim 2, wherein said first carboxylated urethane polymer comprises between about 15 to about 25 wt % of said composition, and said second carboxylated urethane polymer comprises from about 20 to about 30 wt % of said composition.

4. The tintable coating composition of claim 1, wherein said hydroxylated methylmethacrylate acrylic polymer emulsion comprises 30–40 wt % of said composition.

5. The tintable coating composition of claim 1, wherein said epoxylated silane cross-linking agent comprises glycidoxypropyltrimethoxysilane.

6. The tintable coating composition of claim 5, wherein said glycidoxypropyltrimethoxysilane comprises from about 0.5 to about 10 wt % of said composition.

7. The tintable coating composition of claim 6, wherein said glycidoxypropyltrimethoxysilane comprises from about 1.5 to about 4 wt % of said composition.

8. The tintable coating composition of claim 1, wherein said solvent is selected from the group consisting of water, N-methylpyrrolidone, butylcarbitol, 2-butoxyethanol, isopropyl alcohol, and combinations thereof.

9. The tintable coating composition of claim 1, further comprising a decorative component selected from the group consisting of dyes, colorants, pigments, metal flakes, metal powders, glass flakes, glass powders, and combinations thereof.

10. The tintable coating composition of claim 9, wherein said decorative component is present in said coating composition from between about 5 and about 40 wt % of said coating composition.

11. The tintable coating composition of claim 10, wherein said decorative component is present in said coating composition from between about 15 and about 20 wt % of said coating composition.

12. The tintable coating composition of claim 1, further comprising one or more additives selected from the group consisting of film-forming agents, surfactants, defoamers, and combinations thereof.

13. The tintable coating composition of claim 12, wherein said additives comprise, in total, between about 0.005 to about 2 wt % of said composition.

14. A tintable coating composition, comprising an admixture of:
   A. about 2 to about 80 wt % of a carboxylated urethane polymer mixture made from 2,6-hexanediol and 4,4-methylenebis(cyclohexylisocyanate), wherein said carboxylated urethane polymer mixture comprises a mixture of a about 2 to about 75 wt % of a first carboxylated urethane polymer made from 2,6-hexanediol and 4,4-methylenebis(cyclohexylisocyanate), and having an acid number of about 36, and about 5 to about 80 wt % of a second carboxylated urethane polymer made from 2,6-hexanediol and 4,4-methylenebis(cyclohexylisocyanate), and having an acid number of about 28;
   B. about 5 to about 65 wt % of a hydroxylated methyl-methacrylate acrylic polymer emulsion;
   C. about 0.2 to about 10 wt % of an epoxylated silane cross-linking agent comprising glycidoxypropyltrimethoxysilane;
   D. about 5 to about 40 wt % a decorative component selected from the group consisting of dyes, metal flakes, metal powders, glass flakes, glass powders, and combinations thereof;
   E. about 0.005 to about 2 wt % of one or more additives selected from the group consisting of surfactants, defoamers, and combinations thereof; and
   F. optionally, about 0.5 wt % to about 25 wt % of a solvent selected from the group consisting of water, N-methylpyrrolidone, butylcarbitol, 2-butoxyethanol, isopropyl alcohol, and combinations thereof; all percentages based on the total weight of the coating composition.

15. A substrate coated with the tintable coating composition of claim 14.

* * * * *